J. SCHAIBLE.
AGRICULTURAL TOOL.
APPLICATION FILED JUNE 25, 1917.
1,280,866.
Patented Oct. 8, 1918.
2 SHEETS—SHEET 1.
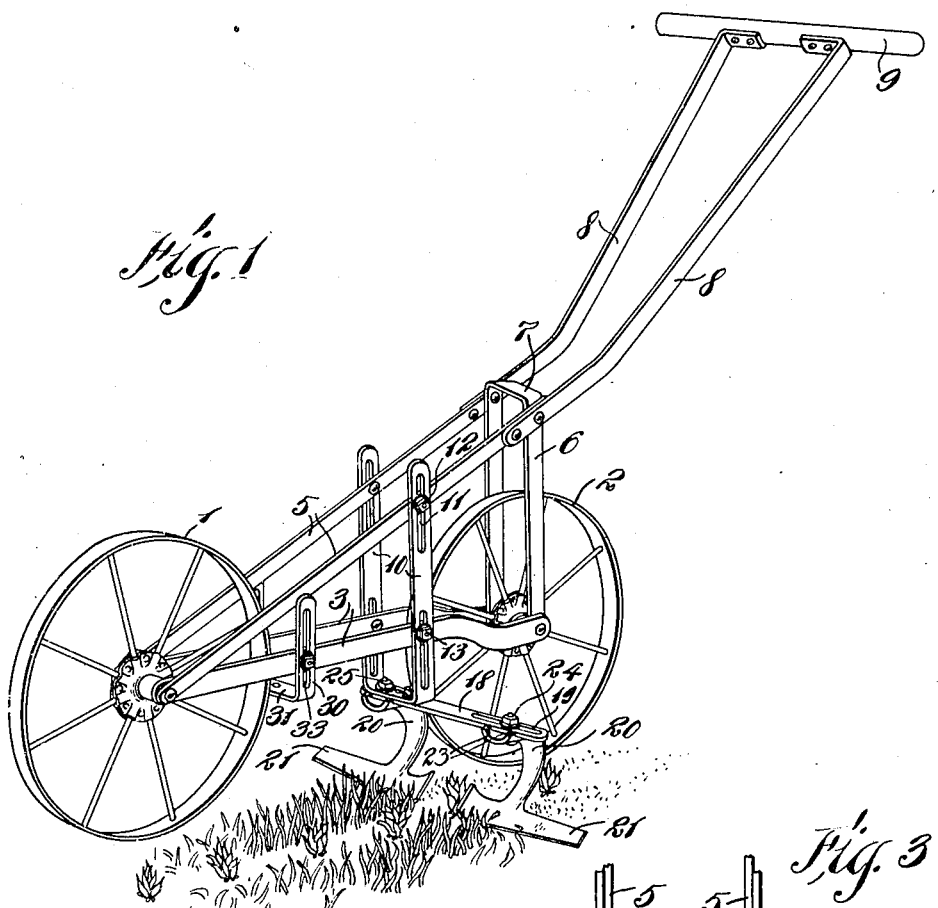
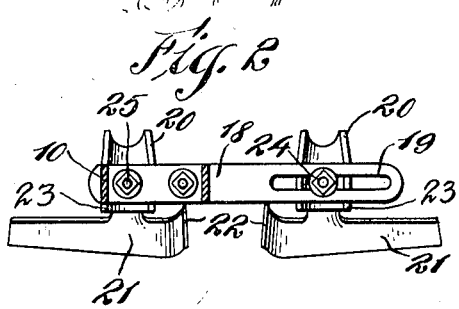
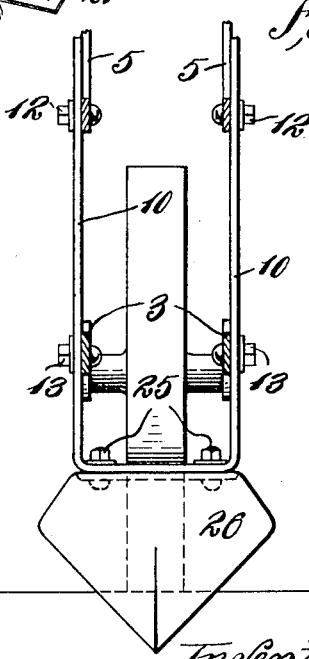
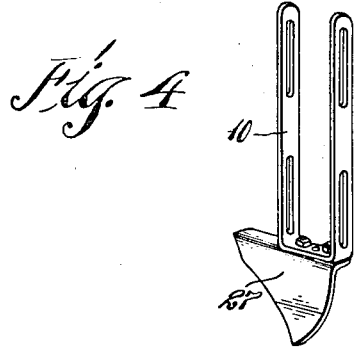
Inventor
John Schaible
By Bates & Macklin
Attys.

J. SCHAIBLE.
AGRICULTURAL TOOL.
APPLICATION FILED JUNE 25, 1917.

1,280,866.

Patented Oct. 8, 1918.
2 SHEETS—SHEET 2.

Inventor
John Schaible,
By Bates & Macklin,
Attys.

UNITED STATES PATENT OFFICE.

JOHN SCHAIBLE, OF ELYRIA, OHIO.

AGRICULTURAL TOOL.

1,280,866.

Specification of Letters Patent.

Patented Oct. 8, 1918.

Application filed June 25, 1917. Serial No. 176,674.

*To all whom it may concern:*

Be it known that I, JOHN SCHAIBLE, a citizen of the United States, residing at Elyria, in the county of Lorain and State of Ohio, have invented a certain new and useful Improvement in Agricultural Tools, of which the following is a full, clear, and exact description, reference being had to the accompanying drawings.

This invention relates to hand operated cultivators. The principal object is to make such a device which may be cheaply manufactured and which shall be light, strong and durable in service.

My invention comprises a carrier frame mounted on wheels and adapted to position various forms of tools or blades in operative relation to the carrier, whereby mere propulsion of the carrier may cause their operation. More specific objects of the invention are to render the device capable of convenient interchange of weeding tools and different forms of ground working tools. Another object is to so arrange the frame parts that such tools may be readily positioned in any desired relation to the carrier without materially interfering with their position relative to the frame, or preventing the carrier wheels from properly avoiding the rows.

My invention is hereinafter more fully described in connection with the accompanying drawings. Other features and objects will become apparent in such description. The essential characteristics are summarized in the claims.

Figure 5:
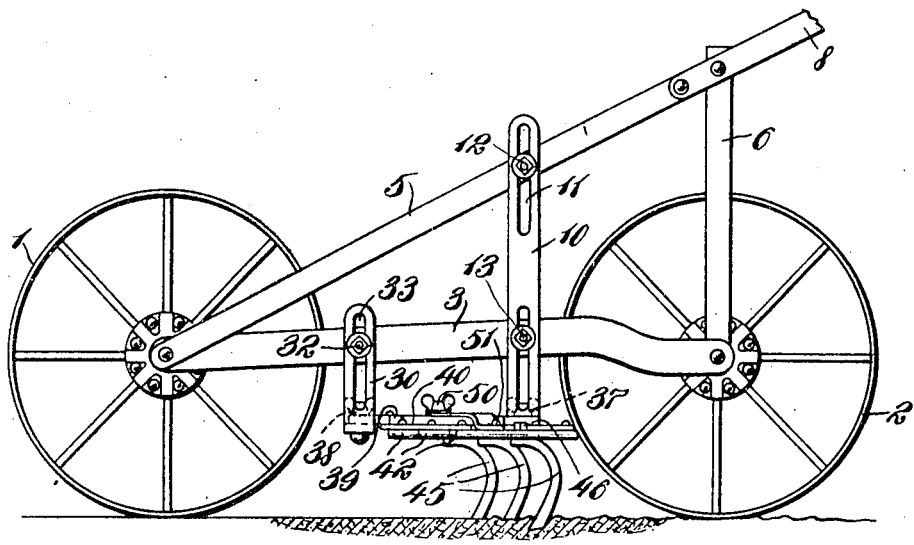
Figure 6:
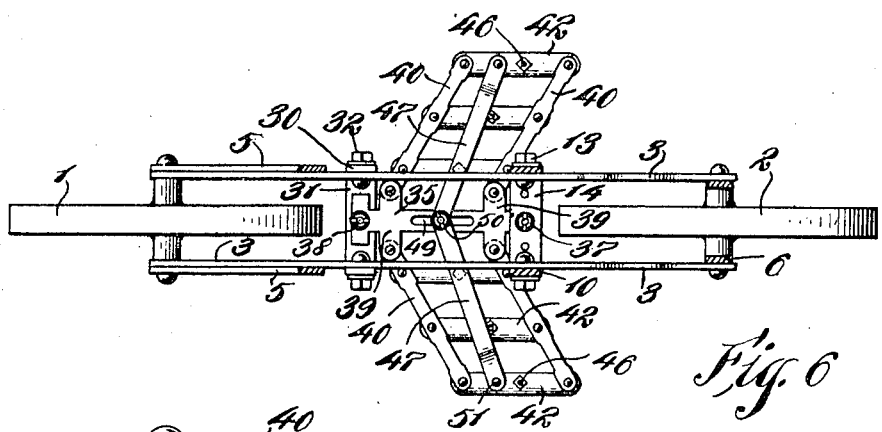
Figure 7:
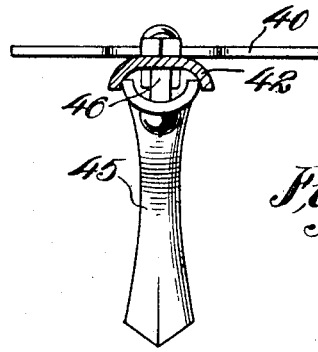

In the drawings, Figure 1 is a perspective view of my cultivator showing weeding knives operating on each side of a single row; Fig. 2 is a plan of the support and these weeding members; Fig. 3 is a front elevation of this support showing the manner of connecting the same with the frame and illustrating a furrow-making hoe carried thereby; Fig. 4 illustrates another form of ground breaking tool carried by the support; Fig. 5 is a side elevation of the cultivator showing the manner of carrying a removable cultivator frame by the main frame; Fig. 6 is a sectional plan of the same; Fig. 7 is a sectional view of a cultivator tooth and support.

Describing the parts by reference numerals, 1 and 2 indicate supporting wheels, preferably of substantially the same diameter, connected by parallel struts 3 embracing the axles of the wheels, and extending upwardly and rearwardly from the axle of the front wheel 1 are struts 5 connected at their rear ends by suitable bolts or rivets with extensions 8 which have their upper ends turned inwardly and secured to a transverse handle 9. Rising from the axle of the wheel 2 are parallel struts 6 integrally connected by a cross strip 7 and secured by bolts or rivets to the overlapping portions of the strips 5 and 8. These struts and braces are preferably all made from flat iron strips capable of withstanding jars, blows and rough treatment generally, while having the great advantage of being cheaply secured and formed for the required use.

The members 5 and 3 lie in substantially parallel planes, and to provide a support for the operating tools, I have shown a U-shaped strip 10 having vertical slots 11 adapted to receive bolts 12 and 13 through the strips 5 and 3 respectively for securing the support to the strips and permitting its vertical adjustment. This support has a horizontal connecting section 14 through which are openings suitably spaced to coact with openings in a transverse strip 18 forming one of the tool supports. This transverse strip is provided with a slot 19.

This support is capable of holding different forms of tools in various positions relative to the path of the wheels, for example, in Fig. 1 are shown two weeding members comprising curved shanks 20 integral with laterally extending knives 21 each provided with an upwardly curved end 22. These may very conveniently remove weeds closely adjacent to a row of plants by bringing the up-turned portions 22 adjacent each other and securing the members to the bar 18 by bolts 24 and 25, the bolt 24 merely extending through the slot 19 and acting to bring the flanges of the shank 20 into close engagement with the bar 18, while suitable lugs 23 formed on this shank engage the forward edge of the bar. In the arrangement shown the opposed weeding knife has its forwardly turned shank positioned beneath one of the openings in the connecting section 14 of the support, whereby the bolt 25 may extend through the support, the bar 18 and into the shank of the blade.

It will be seen that the bar 18 may be readily changed to project at the opposite side of the frame, it being only necessary to remove the bolts 24 and 25 and readjust the blades, while the slot 19 permits the blades to be operated at various distances apart.

In Fig. 3 is shown a furrow-making hoe 26 secured to the support by bolts 25 through a rearwardly turned flange thereof. In Fig. 4 is shown another form of hoe or point 27 adapted to make a furrow by turning the earth to one side, whereby the furrow may be covered by this same hoe, moved in the opposite direction to throw the dirt back into the same. It will be seen that either of these points may be held in alinement with the path of the wheels or at one side thereof by mounting them on the bar 18.

It will be seen that by the arrangement described I have provided for great variation in the forms of tools and their relative positions to the support and to the wheels. The hoes or weeding members may be vertically adjusted by reason of the slots 11 and laterally positioned as desired by reason of the transverse bar 18 with its openings and slots, and this adjustment does not change the angle of the frame or the height of the handle 10.

Referring now to the cultivator frame and teeth as illustrated in Figs. 5 to 7 inclusive, an additional U-shaped support embracing one of the members 3 is illustrated at 30 secured by bolts 32 through vertical slots 33. This member 30 has a connecting portion 31 provided with a central opening. A cultivator member comprising a removable frame having adjustably positioned bars supporting the teeth may be carried by the supports 10 and 30, as shown in Figs. 5 and 6 hereof and as hereinafter described. By my invention such entire tool carrying frame may be adjusted vertically without changing the height of the cultivator frame or the angle of engagement of the tools.

The removable cultivator frame as shown, comprises a central longitudinal strip 35 having laterally turned ears at their ends and openings to receive bolts 37 and 38 through the support members 14 and 31 respectively. These bolts are shown as provided with thumb screws to facilitate removal and replacement of the cultivator. Laterally turned ears 39 at opposite sides of the central strip and spaced apart form pivots for outwardly extending swinging arms 40 to which are pivotally secured connecting parallel bars 42. These bars 42 are preferably flanged downwardly for stiffness, and to facilitate holding the cultivator teeth. The teeth 45 are shown as formed of strips bent U-shaped in cross section and curved to present the upper portion horizontally to the channels 42. Thus when bolts 46 are in position they may be very tightly secured.

It will be seen that by this arrangement the bars 40 may be swung about their pivots, while the connecting members 42 remain parallel, thus varying the distance between these connecting members. In other words, widening or narrowing the cultivator. To hold the cultivator teeth in any position thus given them, I provide members 47 pivoted to the outer bars 42, bent upwardly to clear the bolts 46, and overlapping the central strip and adapted to be clamped in any position along a slot 49 by a thumb nut 50 on a suitable bolt extending through the slot and overlapping ends of the bars 47. As these bars are of different length than the bars 40, when the thumb nut 50 is tightened, the cultivator frame members cannot swing in either direction.

The adjustment to raise or lower the teeth of the cultivator is accomplished by merely raising or lowering the supports 10 and 30, and as the cultivator points 45 preferably have a given angle with relation to the ground, a valuable feature of my adjustment is that these points may be thus raised or lowered without altering such angle.

Having thus described my invention, what I claim is:

1. In a cultivator, the combination of a wheeled frame comprising a pair of wheels one in front of the other and two bars respectively on opposite sides of the wheels connecting their axles, two handle bars connecting with such wheeled frame, a U-shaped bar having its intermediate portion between the wheels and its legs extending upwardly across the bars mentioned, means for adjustably clamping each leg to the two bars on that side of the cultivator, and a tool carried by the intermediate portion of the U-shaped bar.

2. In a cultivator, the combination of a pair of wheels, two bars on opposite sides of the wheels connected with their axles, two bars inclining upwardly from adjacent to the front axle, an upright U-shaped bar having its intermediate portion between the wheels and its legs extending in engagement with the four bars mentioned, said U-shaped bar being slotted where it crosses the four bars, bolts occupying such slots for adjustably clamping the U-shaped bar, and a ground digging tool adjustably carried by the intermediate portion of the U-shaped bar.

3. In a cultivator, the combination of a pair of wheels arranged tandem, side bars on opposite sides of the wheels connecting their axles, inclined bars extending upwardly from adjacent to the front axle, two U-shaped bars located tandem and having their intermediate portion between the wheels one U-shaped bar having its legs engaging and adjustably secured to the bars connecting the axles and the other U-shaped bar having its legs engaging and adjustably secured to the bars engaging the axles and the inclined bars, and a cultivator member secured to the intermediate portion of both U-shaped bars.

In testimony whereof, I hereunto affix my signature.

JOHN SCHAIBLE.